W. W. St. JOHN.
Wheel Cultivator.
No 51,096.                                                    Patented Nov. 21, 1865.
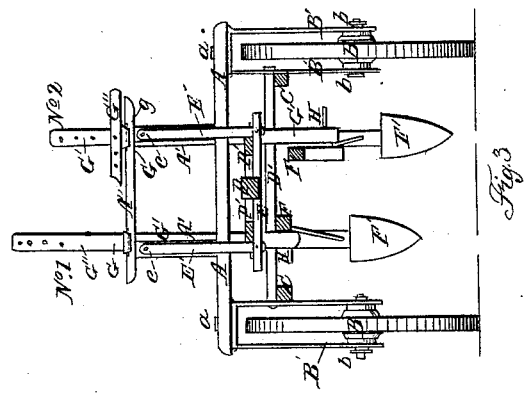
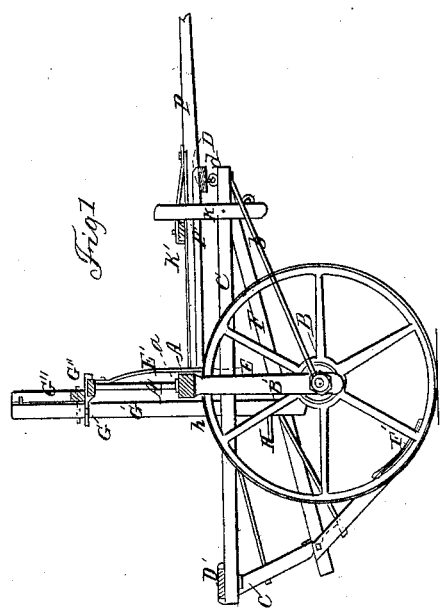
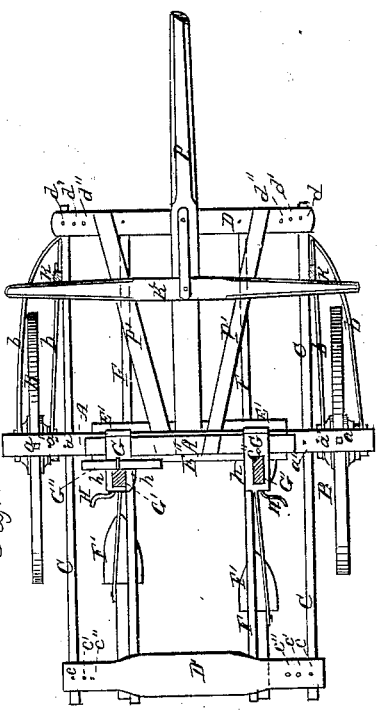
Witnesses;
M. Randolph
A. Wagner
Inventor;
Wm W St John

UNITED STATES PATENT OFFICE.

W. W. ST. JOHN, OF ST. LOUIS, MISSOURI.

IMPROVEMENT IN CULTIVATORS.

Specification forming part of Letters Patent No. 51,096, dated November 21, 1865.

*To all whom it may concern:*

Be it known that I, W. W. ST. JOHN, of the city and county of St. Louis, and State of Missouri, have invented a new Cultivator; and I do hereby declare that the following is a full, clear, and exact description thereof, reference being had to the accompanying drawings, and to the letters of reference marked thereon.

Figure 1 of the annexed drawings is a side elevation of the improved cultivator. Fig. 2 is a plan of it, and Fig. 3 is a transverse sectional elevation taken on the line A B in Fig. 2.

The object of this invention is to produce a cultivator which can be readily thrown to either side of the row of plants which is being cultivated by means of the operator's feet; and in order to facilitate this movement the wheels upon which it is mounted are made to move in harmony with the frame of the machine, and the operator is so seated that in his efforts to throw the plows or shovels to one side with his feet his body will exert an equal influence upon the frame in an opposite direction, which counter-exertion will, by the peculiar construction of the machine, act favorably for the accomplishment of the desired result, and a cultivator built in the manner proposed will be peculiarly adapted to the cultivation of plants upon hillsides. The invention, furthermore, relates to some minor peculiarities of construction, as will be hereinafter explained.

To enable those skilled in the art to make and use my improved cultivator, I will proceed to describe its construction and operation.

A is a transverse beam placed directly over the wheels B, which are connected with it by means of forked wheel-stands B', on the tops of which the beam rests, and to which it is secured by the bolts $a$, passing through the two parts, so as to allow them to turn on it in such a manner as to form a swivel-joint between them. The two posts A' are erected upon the top of the beam A and are capped by the beam A''.

There are two longitudinal beams, C, that are securely fastened to the inner sides of the wheel-stands, parallel with the faces of the wheels, and the braces $b$, running from the forward end of each of them to the lower ends of the wheel-stands, secure perfect rigidity between these parts. The forward ends of the beams C are suspended under the cross-bar D by means of short links $d$ or their equivalents, so as to form a hinge-joint between these parts, in order to allow a lateral motion of the beams.

A plank, D', which serves for the driver's seat, is placed across and on top of the back ends of the beams C, to which it is fastened by means of bolts or pins $c$ passing through them, and allowing, as in the case of the connection of the bar D with their forward ends, a lateral motion to the beams C. The holes $c'$ $c''$ in the plank D', the holes $d'$ $d''$ in the cross-bar D, and the holes $a'$ $a''$ in the beam A, are intended for use in case it becomes desirable to make the machine narrower, which can be readily accomplished by transferring the bolts, pins, or hooks already described to those holes, as may be required.

E is a swinging beam, which is suspended under the beam A by the two links E', the upper ends of which are hinged to the posts A' by the bolts $e$, passing through both the link and post, and permitting the links to have a lateral motion. The rear end of the pole P is firmly fastened to the swinging beam E and the cross-bar D, and the two braces P', one of which is placed on either side of the pole and fastened to the same pieces that it is, renders those parts firmly braced together. There may be two or more plow-beams, F, fastened to the cross-bar D in a similar manner to that already described for the beams C. The ordinary shovel or cultivator plows F' are fastened to the back ends of the beams F in the usual manner.

There are metallic slides G placed on top of the beam A'', so they can be moved toward either side at pleasure, and they may be fixed in any desirable position by driving the keys $g$ between them and the beam. The slides G extend behind the beam A sufficiently to receive a mortise large enough to permit the vertical slides G' to pass easily through them. There are metallic guides $h$ fastened to the swinging beam E, for the reception and guidance of the vertical slides G' at that point. There are hooks H fastened to the slides G' a short distance above the plow-beam F, upon which the driver will place his feet to manipulate the machine. The beams F are hinged to the lower ends of the slides by means of bolts passing through them, so as to allow a lateral motion.

The upper ends of the slides G' are provided with short props G'', which are loosely attached to them by means of bolts passed through both pieces. There should be several holes made in both the slide and prop, so as to set or adjust the latter at any required elevation. These props are shown in Fig. 3 in two positions. The one marked No. 1 is when the cultivator is being driven from place to place without the plows at work. The position No. 2 is when the plow is let down to work.

In order to bring the line of draft in as straight a line as possible between the work and the necks of the animals of the team, the single-trees should be attached to the hooks on the lower ends of the levers K, which are fastened to the sides of the beams C, with their upper ends behind the evener K'.

The machine constructed as above described, the driver may take his position upon the seat D' and place his feet upon the hooks H. When he comes to any place where he wishes to cause the plows to advance to either side particularly all he will have to do will be to press hard with one foot upon one of the hooks H, which will force his body and the seat D' in the opposite direction. The seat D', being connected with the beams C and wheels B, as already described, will turn the wheels so they will tend to move in the same direction it is desired the plows should go, thereby assisting the operator to bring the plows to the desired position.

The driver, when seated on D', can easily reach down with one hand and raise each of the beams F up separately, so the prop G'' can drop into its position No. 1 without the aid of complicated levers, such as are usually employed for this purpose.

Having described my invention, what I claim is—

1. Mounting the beam A on the wheel-stand B', the two parts being connected together by means of the bolt $a$ or its equivalent, so as to form a swivel-joint for the purpose of allowing the wheel B to be turned to either side to assist in the guidance of the plows F.

2. The combination of the wheel-stands B' and frame A A' A'' and frame C D D' with the swinging frame E E' and plow-beams F, as and for the purpose set forth.

WM. W. ST. JOHN.

Witnesses:
M. RANDOLPH,
A. WAGNER.